UNITED STATES PATENT OFFICE.

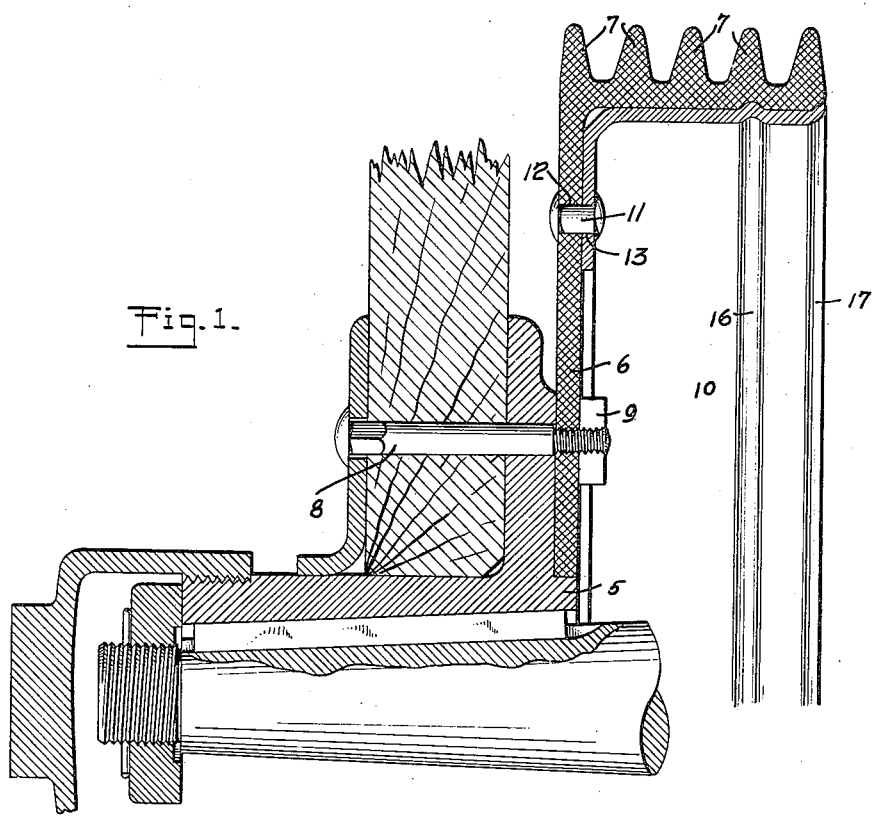
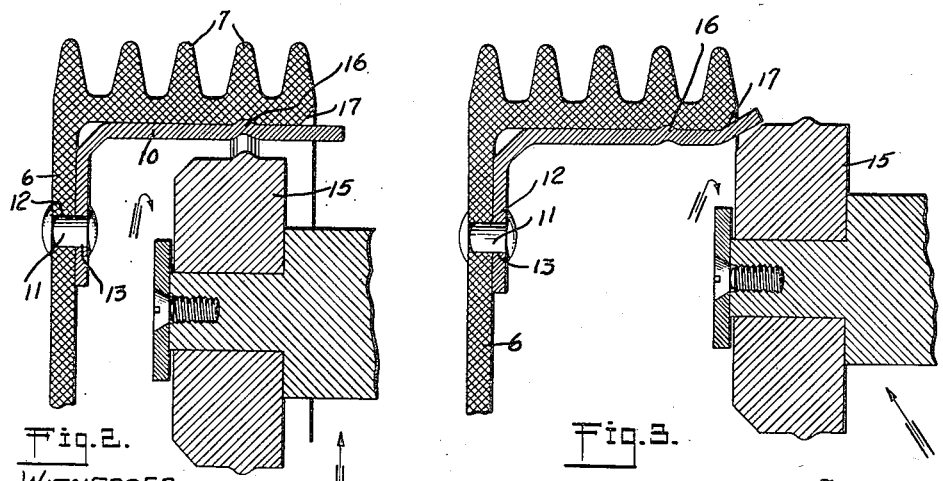

VICTOR W. PAGÉ, OF NEW YORK, N. Y.

BRAKE DRUM.

1,425,414.  Specification of Letters Patent.  Patented Aug. 8, 1922.

Application filed June 4, 1921. Serial No. 475,152.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Brake Drum, of which the following is a full, clear, and exact description.

The present invention relates to new and useful improvements in brakes, and it pertains more particularly to brake drums.

It is the primary object of the invention to construct a brake drum of relatively soft material and provide the same with a hardened lining adapted to take the wear and tear of the braking operation.

It is a further object of the invention to attach the brake drum lining in a new and novel manner in order that the braking strain will be taken from the rivets employed in holding the lining in place and a shearing of the rivets prevented.

With the above and other objects in view, reference is had to the accompanying drawings, in which Figure 1 is a detail sectional view of the hub portion of the wheel showing the brake drum in position thereon;

Fig. 2 is a detail sectional view showing one of the steps in the operation of applying the lining to the drum, and Fig. 3 is a similar view showing another step in applying the lining to the drum.

Referring more particularly to the drawings, the reference character 5 designates the wheel hub, and 6 designates the drum. The drum is constructed of magmalite or other suitable material, and said drum is provided upon its outer surface with a plurality of heat-radiating faces 7. This brake drum 6 is secured to the hub of the wheel by means of bolts or the like 8, and having threaded engagement with the inner end of said bolts 8 are nuts 9. The reference character 10 designates the brake drum lining and said brake drum lining is retained in place by means of rivets 11. After this is done, a suitable tool 15 is employed and said tool is adapted to spin the brake drum lining 10 into an annular recess 16 formed in the inner surface of the brake drum. When this has been accomplished the tool 15 is again used as shown in Fig. 3 in order that the outer edge of the brake drum lining 10 may be spun upwardly into contact with the annular face 17 defining the outer edge of the brake drum 6, as shown in Fig. 3, after which the projecting portion of the brake drum lining 10 is trimmed off and the brake drum lining 10 assumes the appearance illustrated in Fig. 1.

From the foregoing it is apparent that the present invention illustrates a construction by means of which brake drums may be made of a light material, and, at the same time, the brake drum is provided with a wearing surface which will effectively withstand the wear and tear of the braking operation.

I claim:

1. A brake drum having a channel on its inner surface, a lining for said brake drum, and a projection formed on said lining and adapted to be received in said channel to secure the lining within the drum.

2. A device of the character described comprising a brake drum provided on its inner surface with a continuous annular channel, a lining for said brake drum, said lining being distorted inwardly of said annular channel.

3. A device of the character described comprising a brake drum provided with an internal annular channel and an annular face defining its open side, and a lining for said brake drum, said lining being spun into the annular channel and shaped to conform to the angular face defining the open side of said drum.

4. In a device of the character described, a brake drum having an inner surface of irregular contour, a lining conforming to the irregular inner surface of said brake drum. and a plurality of rivets for securing said lining into position within the brake drum.

VICTOR W. PAGÉ.